United States Patent [19]

Hinn

[11] Patent Number: 4,600,950
[45] Date of Patent: Jul. 15, 1986

[54] KINESCOPE BIAS SENSING CIRCUIT

[75] Inventor: Werner Hinn, Zollikerberg, Switzerland

[73] Assignee: RCA Corporation, Princeton, N.J.

[21] Appl. No.: 656,470

[22] Filed: Oct. 1, 1984

[51] Int. Cl.⁴ .............................................. H04N 5/68
[52] U.S. Cl. .................................... 358/243; 358/171
[58] Field of Search ...................... 358/27, 33, 34, 65, 358/74, 171, 165, 242, 243

[56] References Cited

U.S. PATENT DOCUMENTS

| | | | |
|---|---|---|---|
| 4,263,622 | 4/1981 | Hinn | 358/242 |
| 4,387,405 | 6/1983 | Hinn | 358/243 |
| 4,463,385 | 7/1984 | Parker | 358/242 |
| 4,502,079 | 2/1985 | Filliman | 358/243 |

OTHER PUBLICATIONS

Technical Bulletin for Phillips TDA 3505 Integrated Circuit, pp. 457-464, Feb. 1982.

Primary Examiner—Tommy P. Chin
Attorney, Agent, or Firm—P. J. Rasmussen; P. M. Emanuel; R. H. Kurdyla

[57] ABSTRACT

A video signal processing and display system includes an image displaying kinescope, a kinescope driver amplifier, and a system for automatically controlling the kinescope bias in response to a sensed signal representative of the kinescope black current level. The sensed signal is developed across a relatively small value sensing resistor coupled in series with a load resistor between a source of operating potential and the video output terminal of the driver amplifier, in the order named.

7 Claims, 3 Drawing Figures

KINESCOPE BIAS SENSING CIRCUIT

This invention concerns a sensing circuit associated with apparatus for automatically controlling the bias of an image display device such as a kinescope in a television receiver.

Video signal processing and display systems such as television receivers and video monitors sometimes employ an automatic kinescope bias (AKB) control system for automatically maintaining proper black current levels for each electron gun of an associated image displaying kinescope. As a result of this operation, displayed picture colors and picture gray scale are prevented from being adversely affected by variations of kinescope bias from a desired level due to aging and temperature effects, among other factors. Various types of AKB systems are known, such as are described in my U.S. Pat. Nos. 4,263,622 and 4,387,405 for example.

An AKB system typically operates during image blanking intervals when the kinescope conducts a small black level representative current. This current is sensed by the AKB system to generate a control signal representing by the difference between the sensed black current level and a desired black current level, and the control signal is applied to video signal processing circuits with a sense for reducing the difference.

In many instances it is important to reduce the capacitive loading of the video output driver stage by the AKB system to avoid degrading the high frequency characteristics of the video signal. This is especially important in the case of wideband video display systems, including television receivers and video monitors.

One source of potentially excessive capacitive loading of the driver stage by the AKB system is the sensing circuit which is used to sense the kinescope black current. Various techniques for sensing the black current are known, many of which suffer from one or more disadvantages related to excessive capacitive loading, cost, complexity, or performance.

For example, one technique employs a relatively costly high voltage PNP current sensing transistor coupled to the kinescope cathode signal path for directly sensing the kinescope black current during kinescope blanking intervals, as described in U.S. Pat. No. 4,237,479-Lavigne. Such current sensing transistor introduces substantial capacitive loading, and as such is undesirable for wideband video systems. U.S. Pat. No. 4,387,405—Hinn discloses an AKB system wherein the kinescope black current is sensed across the load resistor of an active load circuit for the kinescope driver stage. U.S. Pat. No. 4,463,385—Parker describes an AKB sensing circuit wherein the kinescope black current is sensed by means of a resistor coupled between the input and output transistors of a cascode kinescope driver stage. The latter two sensing techniques do not exhibit as much capacitive loading as in the case of the PNP transistor current sensor, but they use closed loop degenerative current feedback around the driver stage. Such feedback is undesirable for wideband driver stages since driver instability can result due to the high frequencies involved. A black current sensing circuit using a resistive voltage divider coupled to the kinescope cathode signal path is described in U.S. Pat. No. 4,263,622—Hinn. This circuit exhibits little capacitive loading of the driver stage and can be used with a driver stage without current feedback. However, the resistance values of the resistors forming the voltage divider must be large to avoid excessive DC loading of the driver stage, which results in poor sensitivity. Specifically, large resistors undesirably increase the susceptibility of the sensing circuit to interference pick-up and noise, resulting in a degraded signal-to-noise factor for the sensed black current signal.

A kinescope black current sensing circuit disclosed herein advantageously substantially reduces capacitive loading of the kinescope driver stage, provides a sensed black current signal at relatively low impedance for improved noise and interference immunity, and is uncomplicated and inexpensive.

In accordance with the principles of the present invention, the black current sensing circuit is associated with the output circuit of the driver stage and includes first and second resistors coupled in series between an output of the driver stage and an operating potential for the driver stage. The first resistor is connected nearer to the output of the driver stage relative to the second resistor, and is preferably significantly larger than the second resistor, which is connected nearer to the operating potential. The sensed black current signal is developed across the second resistor.

Figure 1:
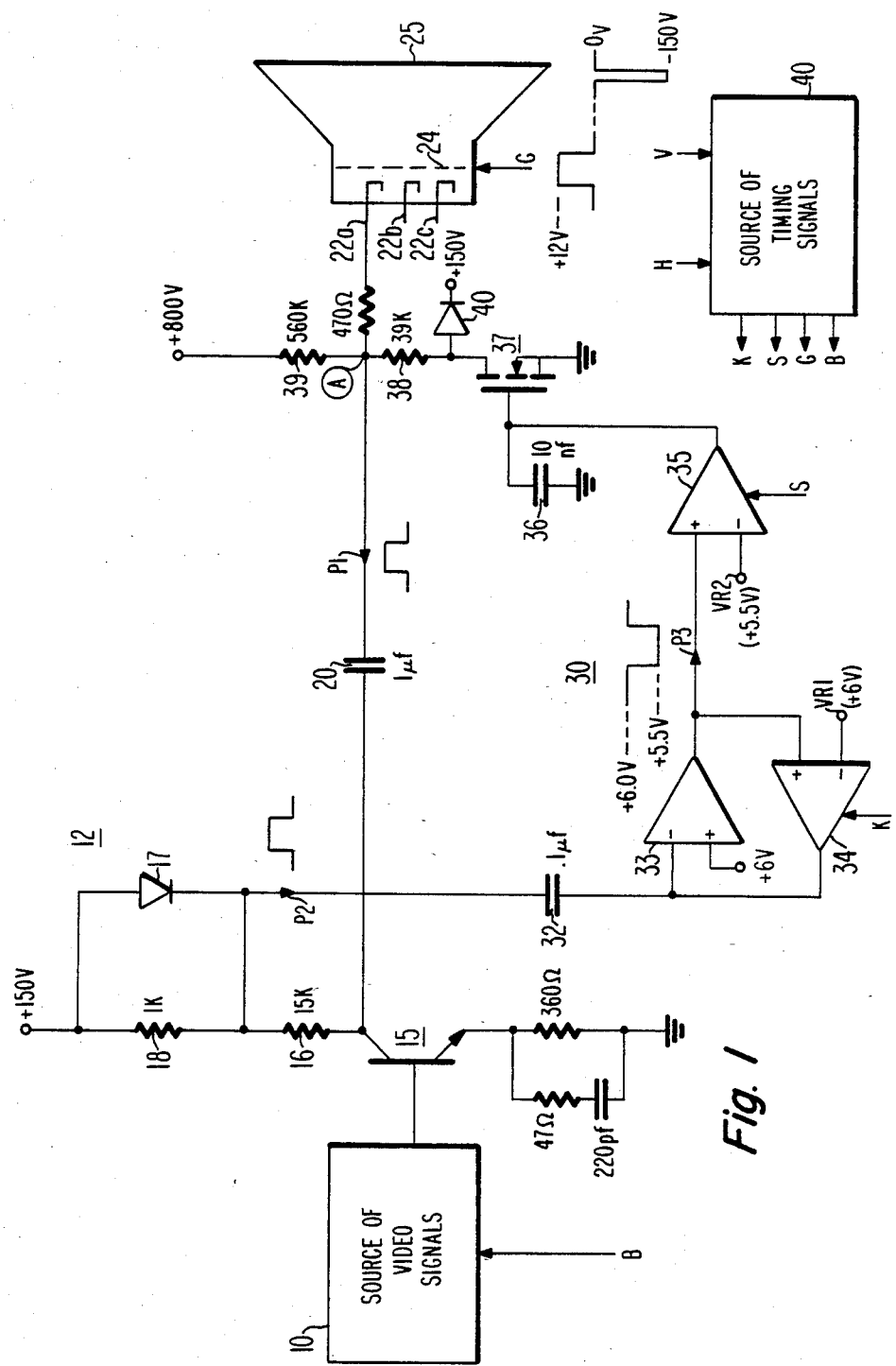
FIG. 1 shows a portion of a television receiver including an AKB system with a sensing circuit in accordance with the present invention.

In FIG. 1, a video signal such as of the red color signal component of a color video signal from a course 10 is amplified by a video output driver amplifier stage 12. Amplifier 12 includes a high voltage transistor 15 with a collector output circuit including a series connected load resistor 16 and a smaller value sensing resistor 18 coupled to a source of operating supply voltage (+150 volts) for transistor 15. Although both resistors 16 and 18 comprise the load for amplifier transistor 15, resistor 16 is considered to be the load resistor for transistor 15 due to its much greater value compared to resistor 18. A normally non-conductive diode 17 limits excessively large video output signal amplitude excursions during normal image intervals. An amplified video signal developed at the collector output of transistor 15 exhibits a magnitude sufficient to drive an intensity control cathode electrode 22a of a color kinescope 25, and is AC coupled to cathode 22a via a capacitor 20. In this illustration kinescope 25 is of the self-converging "in-line" gun type with a commonly energized grid 24 associated with each of separate cathode electrodes 22a, 22b and 22c. The separate cathode electrodes each form an electron gun assembly of kinescope 25 together with grid 24.

An automatic kinescope bias (AKB) control network 30 maintains a desired level of black current conduction for the kinescope electron gun assembly comprising cathode 22a. Similar AKB networks (not shown) are respectively associated with the electron guns comprising cathodes 22b and 22c which receive, e.g., the green and blue color signal components from source 10 in a manner similar to that illustrated for the red signal component. The operation of AKB network 30 will be described with regard to the AKB timing signal waveforms shown in FIG. 2. The timing signals are general by a source 40 in response to a horizontal image synchronizing signal H and a vertical image synchronizing signal V, both derived from deflection circuits of the receiver.

Figure 2:
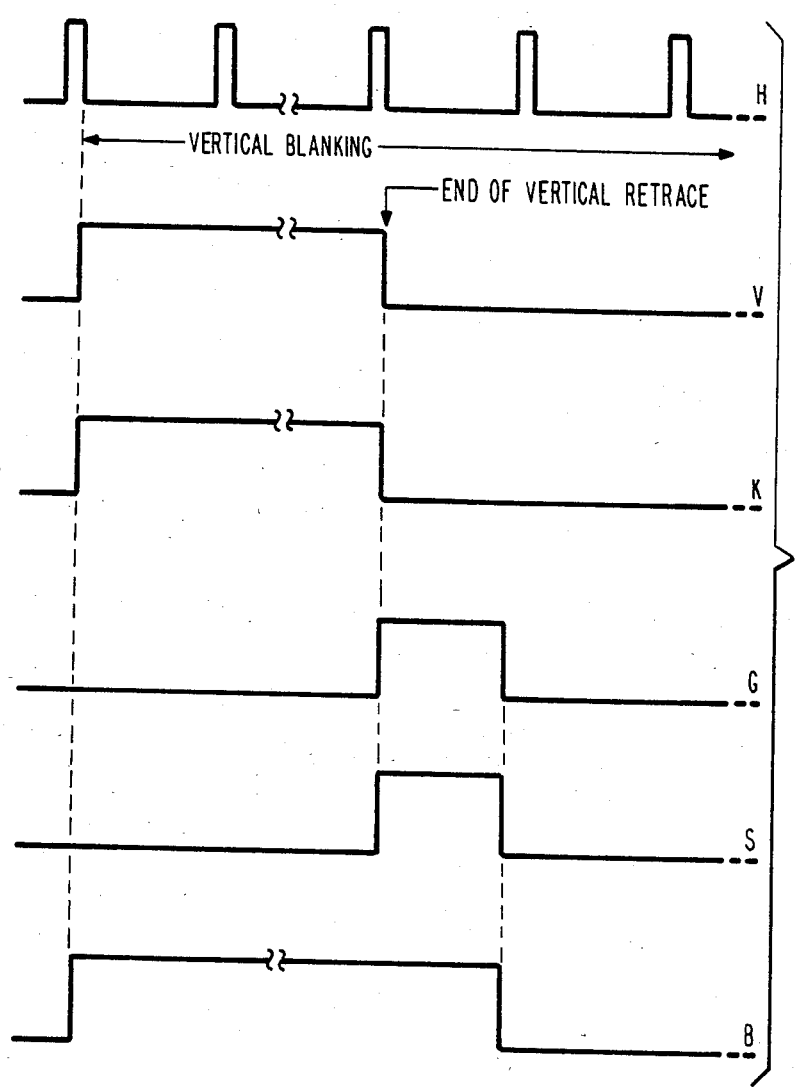
FIG. 2 illustrates timing signal waveforms helpful in understanding the operation of the system shown in FIG. 1.

Referring to FIG. 2 for the moment, the AKB operating interval includes a sensing interval which occurs shortly after the end of each video signal vertical retrace interval within the vertical blanking interval, during which time video signal image information is absent. During the sensing interval a positive grid drive pulse G and a positive sensing enable pulse S are generated as shown, each having a duration of approximately one horizontal image line interval in this example. Also associated with the AKB operation is a clamping interval when a clamp keying pulse K is developed, prior to pulses G and S. A blanking pulse B encompasses the AKB operating interval when pulses K, G and S are developed, and serves to establish a video signal reference condition during the AKB operating intervals.

Continuing with FIG. 1, blanking signal B is applied to a blanking input terminal of signal source 10 to inhibit the video signal output of source 10 during AKB operating intervals. During each AKB black current sensing interval, positive grid drive pulse G forward biases grid 24 of the kinescope, thereby causing the electron gun assembly comprising cathode 22a and grid 24 to increase conduction. In response to pulse G a similarly phased, positive output current pulse is induced at cathode 22a during the grid pulse interval. The amplitude of the cathode output current pulse is related to the level of cathode black current conduction.

The induced cathode output pulse is coupled as a current pulse P1 of approximately 1 microampere via AC coupling capacitor 20 to the collector output circuit of transistor 15, where pulse P1 causes a positive voltage pulse P2 with a peak-to-peak amplitude of approximately 1 millivolt to be developed across sensing resistor 18. Transistor 15 exhibits a high collector impedance whereby current pulse P1 substantially flows through resistors 16 and 18 rather than into the collector of transistor 15.

The manner in which black current representative pulse P2 is sensed via relatively low value sensing resistor 18 results in significantly reduced loading of the kinescope driver stage. This aspect of the disclosed AKB system is particularly advantageous in a wideband system such as a video monitor. In this regard it is noted that in order for a capacitive load to be detrimental to the frequency response of the kinescope driver, it must be effective at the output of the driver (e.g., at the collector output of transistor 15), or anywhere along the signal path between the driver output and the kinescope input. The input capacitance of AKB network 30 has substantially no effect upon the high frequency response of the driver stage because of the isolation produced by relatively large load resistor 16 compared to smaller sensing resistor 18, which desirably presents a much lower impedance to the input capacitance of AKB network 30.

Pulse P2 is AC coupled via a capacitor 32 to an inverting operational amplifier 33 with a voltage gain of approximately 500, so that an amplified, inverted version of pulse P2, shown as a voltage pulse P3, appears at the output of amplifier 33. Pulse P3 exhibits a peak-to-peak amplitude of approximately 0.5 volts with respect to a positive peak pedestal reference level of +6.0 volts which is stabilized by means of a feedback clamping circuit.

The feedback clamping circuit includes an operational transconductance amplifier 34 and capacitor 32. Amplifier 34 has an inverting input(−) coupled to a source of positive DC reference voltage VR1 (+6.0 volts), a non-inverting input (+) which is coupled to the output of amplifiers 33, and an output coupled to capacitor 32 at the inverting input of amplifier 33. Clamping amplifier 34 is keyed to conduct by keying signal K, which immediately precedes the AKB sensing interval encompassed by pulse S, as shown in FIG. 2. By feedback action amplifier 34 modifies the charge on coupling capacitor 32 so as to maintain the positive peak pedestal reference level of signal P3 clamped to 6.0 volts.

Clamped signal P3 is applied to a non-inverting input (+) of an operational transconductance amplifier 35 which acts as a keyed comparator. A positive DC reference voltage VR2 of +5.5 volts in this example is applied to an inverting input (−) of amplifier 35. Amplifier 35 is keyed to conduct by sensing enable pulse S for sensing and comparing the peak amplitude of black current representative input signal P3 with input reference voltage VR2. If the negative-going peak amplitude of signal P3 substantially equals reference voltage VR2, the output current of amplifier 35 does not change. This corresponds to a condition of correct kinescope cathode bias wherein the existing bias of the kinescope is not altered by the AKB system.

Network 30 operates to restore the DC level at cathode 22a via terminal A, thereby establishing the DC bias of cathode 22a, as a function of the magnitude of signal P3.

The peak negative-going amplitude of signal P3 differs from reference voltage VR2 in accordance with the amount by which kinescope cathode bias is incorrect. Illustratively, if the amplitude of signal P3 is such that the output current of amplifier 35 is caused to increase, a related increase in charge is developed on a storage capacitor 36. The increased charge on capacitor 36 causes the conduction of a transistor 37 to increase whereby the current conducted through resistor 38 and 39 increases. Such increased current conduction causes the DC bias voltage at a node A in the cathode signal path to decrease accordingly until the correct bias condition is reached as sensed by amplifier 35. Thus the closed loop control action of the AKB feedback path including capacitor 20, resistors 16 and 18, capacitor 32, amplifiers 33 and 35, transistor 37 and resistors 38 and 39 stabilizes the peak amplitude of signal P3 at a level of VR1-VR2, corresponding to the correct black level kinescope bias condition.

In this example a correct bias condition corresponds to current pulse P1 with a peak amplitude of approximately 1 microampere, voltage pulse P2 with a peak amplitude of approximately 1 millivolt, and voltage pulse P3 with a peak amplitude of approximately +0.5 volts. By feedback action, AKB network 30 will maintain such amplitude levels by modifying the voltage at node A to compensate for a sensed incorrect bias condition. Negligible loading by AKB network 30 at video signal node A can be achieved by choosing resistors 38 and 39 with low end-to-end parasitic capacitance, such as carbon film resistors. A normally non-conductive protection diode 40 prevents high voltage breakdown of transistor 37.

Normal blacker-than-black blanking to suppress the kinescope beam spot during periodic horizontal and vertical image retrace intervals is accomplished by means of a negative going −150 volt pulse applied to kinesope grid 24, rather than by blanking the video signal prior to the kinescope driver amplifier. This method of blacker-than-black retrace blanking eliminates the need for the kinescope driver to accommodate the operating point shifts otherwise associated with blacker-than-black retrace blanking.

Figure 3:
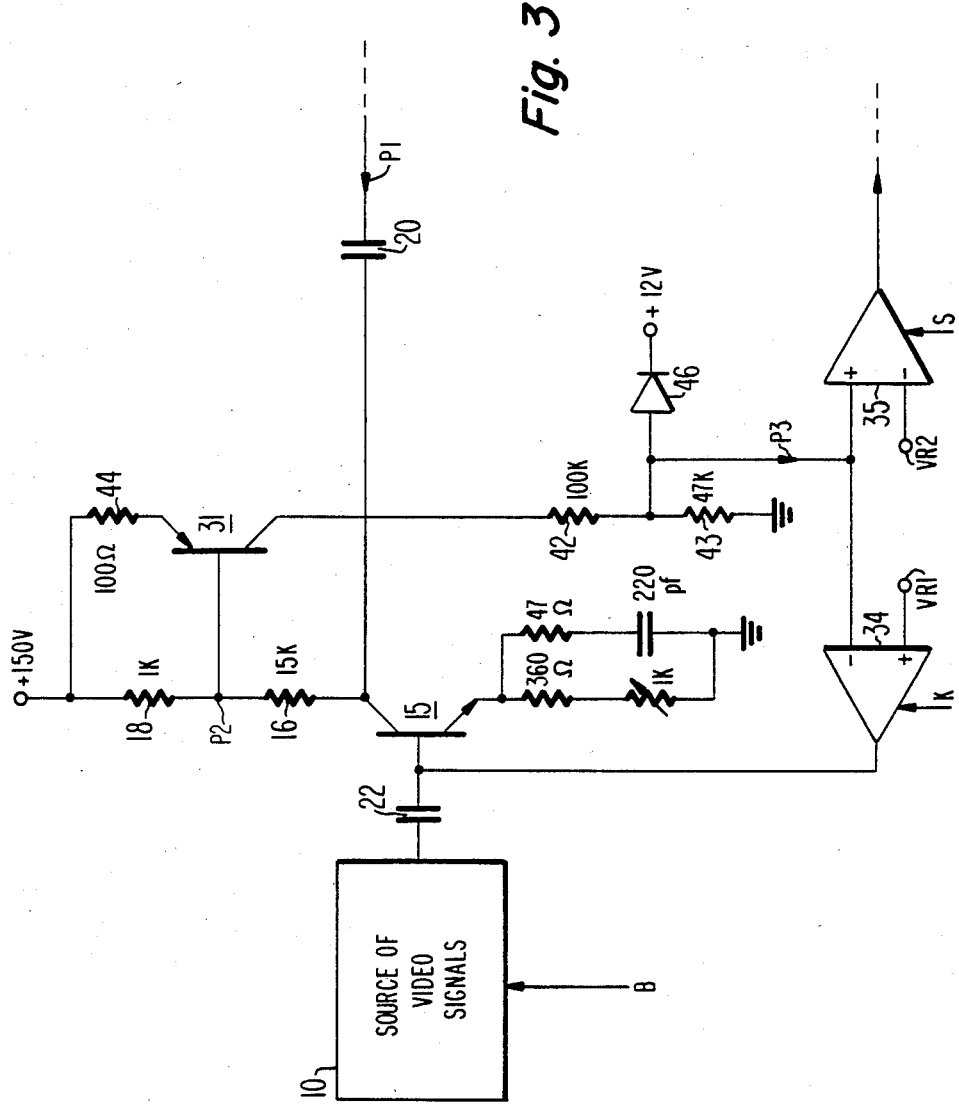
FIG. 3 depicts an alternate form of the AKB system of FIG. 1.

FIG. 3 shows an alternate form of a portion of the AKB system of FIG. 1, wherein corresponding elements are identified by the same reference number, and the leads identified by dashed lines connect to the same places as corresponding leads in FIG. 1. The arrangement of FIG. 3 differs from that of FIG. 1 with respect to the manner in which clamping is accomplished, and with respect to the manner in which signal P2 is amplified to produce signal P3.

In FIG. 3, both black current representative signals P2 and P3 are clamped by means of a keyed feedback clamping circuit including keyed amplifier 34 together with a video signal input capacitor 22 which AC couples video signals to the base input of driver transistor 15. The signal gain imparted to signal P2 to produce signal P3 is provided by means of a circuit including a PNP amplifier transistor 31 with collector output resistors 42 and 43 and an emitter resistor 44. The desired signal gain of approximately 500 is determined by the ratio of the value of resistor 43 to that of resistor 44. Resistor 42 serves to reduce the power dissipation in transistor 31 by reducing its collector-to-emitter voltage, thereby permitting use of a small, inexpensive plastic type transistor for transistor 31. A normally non-conductive protection diode 46 prevents high voltage breakdown of amplifiers 34 and 35.

In both of the FIG. 1 and FIG. 2 arrangements, manual pre-adjustment of picture gray scale balance can be achieved by varying reference voltage VR2 while maintaining reference voltage VR1 constant. This would permit black level pre-adjustment over a small range, such as may be required in certain applications such as precision video monitors.

The described sensing circuit including resistors 16 and 18 can be used with both AC coupled and DC coupled kinescope drivers, and in wideband signal applications smaller values of resistors 16 and 18 could be used to increase the high frequency response of driver 12. Smaller values of sensing resistor 18 require that a correspondingly higher gain be provided by amplifier 33 (FIG. 1) of the circuit including transistor 31 (FIG. 3) to obtain a desired AKB system sensitivity. A practical limit on the smallest value of resistor 18 is determined by the signal gain available from amplifier 33 or transistor 31, and by the signal-to-noise ratio at the output of amplifier 33 or transistor 31. A practical limit on the largest value of resistor 18 is determined by the voltage drop developed across resistor 18, which voltage drop should not consume too much of the available dynamic range for the video signal, and by the total impedance provided by resistors 16 and 18, which determines the bandwidth of the driver stage.

In addition, a cascode amplifier arrangement could replace driver transistor 15, and the sensing arrangement including resistors 16 and 18 could be used in the collector circuit of an active load transistor included in the output circuit of a kinescope driver amplifier. An active load type kinescope driver amplifier is shown, for example, in my U.S. Pat. No. 4,387,405.

What is claimed is:

1. In a video signal processing system including an image display device for displaying video information in response to a video signal applied to an intensity control assembly thereof, apparatus comprising:

a driver amplifier stage for providing a video drive signal from an output circuit of said driver amplifier stage to said intensity control assembly via a video output drive signal path;

means for causing said image display device to conduct a black current during image blanking intervals;

means for developing a signal representative of the magnitude of said black current conducted by said display device during image blanking intervals;

means for sensing said black current representative signal to provide a sensed signal with a magnitude related to the magnitude of said black current representative signal; and control means coupled to said intensity control assembly of said display device and responsive to said magnitude of said sensed signal from said sensing means for automatically maintaining a desired bias condition for said display device; wherein said output circuit of said driver amplifier stage comprises a first resistance and a second resistance connected in series, said sensed signal being developed across said second resistance.

2. Apparatus according to claim 1, wherein said first resistance is coupled in series with said second resistance between a video display drive signal output terminal of said driver amplifier stage and a source of operating potential;

said first resistance is connected nearer to said video output terminal relative to said second resistance and said second resistance is connected nearer to said source of operating potential; and said sensed signal is derived from a point between said first and second resistance.

3. Apparatus according to claim 2, wherein the value of said second resistance is significantly less than the value of said first resistance.

4. Apparatus according to claim 3, wherein said driver amplifier stage comprises a video signal amplifier transistor with a collector output coupled to said video display drive signal output terminal.

5. In a video signal processing system including a kinescope for displaying video information in response to a video drive signal applied to an intensity control assembly thereof comprising a cathode electrode and a grid electrode, apparatus comprising:

a driver amplifier stage for providing a video drive signal from an output circuit of said driver amplifier stage to said intensity control assembly via a video output drive signal path, said output circuit including a load resistor;

means for exciting said intensity control assembly during image blanking intervals to produce an output signal representative of the magnitude of black current conducted by said kinescope;

a sensing resistor also included in said output circuit and coupled in series with said load resistor for developing thereacross a sensed output signal with a magnitude related to the magnitude of said black current representative signal; and control means coupled to said intensity control assembly of said kinescope and responsive to said magnitude of said sensed output signal for automatically maintaining a desired bias condition for said kinescope in accordance with the magnitude of said sensed output signal.

6. Apparatus according to claim 5, wherein
said video drive signal is provided to said cathode electrode; and
said grid electrode is excited to induce said black current representative output signal at said cathode electrode.

7. Apparatus according to claim 6, wherein
said load resistor and said sensing resistor are coupled in series between a video display drive signal output terminal of said driver amplifier stage and a source of operating potential;
said load resistor is connected nearer to said video display drive signal output terminal relative to said sensing resistor and said sensing resistor is connected nearer to said source of operating potential relative to said load resistor; and
the value of said sensing resistor is significantly less than the value of said load resistor.

* * * * *